(12) United States Patent
Saley, Jr. et al.

(10) Patent No.: US 9,247,210 B2
(45) Date of Patent: Jan. 26, 2016

(54) APPARATUS FOR MONITORING TEST RESULTS FOR COMPONENTS OBSTRUCTED FROM VIEW

(71) Applicant: Nissan North America, Inc., Franklin, TN (US)

(72) Inventors: William A. Saley, Jr., Milford, MI (US); Arron Brown, Wixom, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 617 days.

(21) Appl. No.: 13/672,874

(22) Filed: Nov. 9, 2012

(65) Prior Publication Data
US 2014/0132754 A1   May 15, 2014

(51) Int. Cl.
H04N 5/77    (2006.01)
H04N 7/18    (2006.01)
G01M 3/38    (2006.01)

(52) U.S. Cl.
CPC .. *H04N 7/18* (2013.01); *G01M 3/38* (2013.01)

(58) Field of Classification Search
CPC .................................. G01M 3/38; G01M 3/18
USPC .......... 348/125; 386/200, 210, 223, 224, 226, 386/227, 322, 323
See application file for complete search history.

(56) References Cited

U.S. PATENT DOCUMENTS

2006/0279423 A1 * 12/2006 Nazari ........................ 340/541

FOREIGN PATENT DOCUMENTS

GB              2376929        * 12/2002

* cited by examiner

*Primary Examiner* — Robert Chevalier
(74) *Attorney, Agent, or Firm* — Young, Basile, Hanlon & MacFarlane, P.C.

(57) ABSTRACT

Devices and methods for monitoring test results for testing components that are obstructed from the tester's view are provided. One such device is a video apparatus for monitoring a vehicle component undergoing testing comprising a plurality of video cameras; a light source coupled to each of the video cameras and configured to direct light in a direction that a lens of the video camera is directed; a power source electrically coupled to the plurality of video cameras and the light sources; and a controller. The controller is configured to receive video signals from each of the plurality of video cameras and control a display to simultaneously display each of the video signals.

19 Claims, 4 Drawing Sheets

APPARATUS FOR MONITORING TEST RESULTS FOR COMPONENTS OBSTRUCTED FROM VIEW

TECHNICAL FIELD

The invention relates to the field of devices and methods for monitoring test results for testing components that are obstructed from the tester's view.

BACKGROUND

Vehicle components are frequently tested for quality by undergoing repeated testing. For components that are internal a portion of the vehicle and obstructed from view of the tester, the test must be performed and then the portion of the vehicle disassembled until the component can be viewed by the tester. This procedure can require significant time, and accordingly can require significant expense. Furthermore, the repeated opening up of the portion of the vehicle to reveal the component can increase the likelihood that the component or surrounding components will be damaged.

SUMMARY

Disclosed herein are devices and methods for monitoring test results for testing components that are obstructed from the tester's view. One such device is a video apparatus for monitoring a vehicle component undergoing testing comprising a plurality of video cameras; a light source coupled to each of the video cameras and configured to direct light in a direction that a lens of the video camera is directed; a power source electrically coupled to the plurality of video cameras and the light sources; and a controller. The controller is configured to receive video signals from each of the plurality of video cameras and control a display to simultaneously display each of the video signals.

Another such device disclosed herein is a cowl water intrusion test monitoring apparatus comprising a mounting surface comprising a body panel of a vehicle, the body panel partially defining a cavity; a first video camera removably mounted to the body panel within the cavity and oriented such that a lens of the first camera is pointed toward a first component in a first direction; a second video camera removably mounted to the body panel within the cavity and oriented such that a lens of the second camera is pointed toward the first component in a second direction that is different than the first direction; a third video camera removably mounted to the body panel within the cavity and oriented such that a lens of the third camera is pointed toward a second component in a third direction; a fourth video camera removably mounted to the body panel within the cavity and oriented such that a lens of the fourth camera is pointed toward the second component in a fourth direction that is different than the third direction; a light source coupled to a respective video camera and oriented in a same direction as the lens of the respective video camera; a power source electrically coupled to each of the video cameras and light sources; and a controller. The controller is configured to receive video signals from the first, second, third and fourth video cameras and simultaneously display each of the video signals.

A method of monitoring cowl water intrusion as disclosed herein comprises removably mounting a first video camera to a body panel within a cavity defined by the body panel and a cowl cover such that a lens of the first camera is pointed toward a first wiper pivot in a first direction; removably mounting a second video camera to the body panel within the cavity such that a lens of the second camera is pointed toward the first wiper pivot in a second direction that is different than the first direction; removably mounting a third video camera to the body panel within the cavity such that a lens of the third camera is pointed toward a second wiper pivot in a third direction; removably mounting a fourth video camera to the body panel within the cavity such that a lens of the fourth camera is pointed toward the second wiper pivot in a fourth direction that is different than the third direction; shining a light source coupled to a respective video camera in a same direction as the lens of the respective video camera is directed; providing power from a single power source electrically coupled to each of the video cameras and light sources; enclosing the cavity with the cowl cover; running a cowl water intrusion test; receiving video signals from the first, second, third and fourth video cameras during the cowl water intrusion test; and simultaneously displaying each of the video signals on a display.

BRIEF DESCRIPTION OF THE DRAWINGS

The various features, advantages and other uses of the present apparatus will become more apparent by referring to the following detailed description and drawing in which.

DETAILED DESCRIPTION

The devices and methods herein provide the ability to monitor in real time the testing functions of vehicle components not visible to the tester during the active test. The devices and methods provide multiple angle views of the active test, allowing the tester to see results as they develop, thereby eliminating the guesswork inherent in reviewing the results after the test is completed. The devices and methods improve accuracy, reduce the need to repeat tests, reduce the man-hours needed to run the tests, and reduce the expense for purchasing delicate prototype components.

Figure 1:
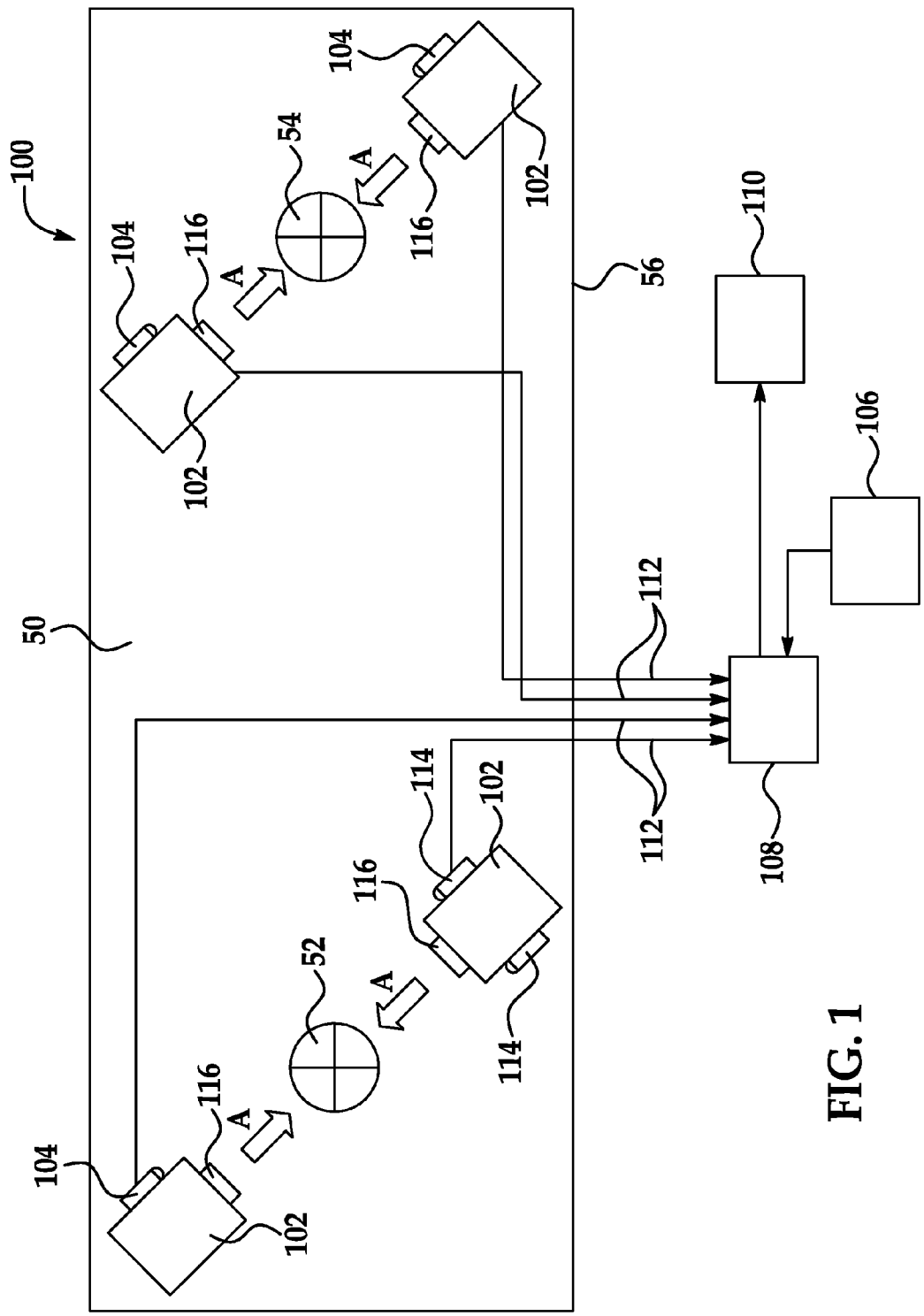
FIG. 1 is a schematic of a video apparatus for monitoring a vehicle component undergoing testing as disclosed herein.

A video apparatus 100 for monitoring a vehicle component 50 undergoing testing is illustrated in FIG. 1. The video apparatus 100 has a plurality of video cameras 102. Four are shown in FIG. 1 as a non-limiting example. Any number can be used as desired or required. A light source 104 is coupled to each of the video cameras 102, each configured to direct light in a direction that a lens of its respective video camera 102 is directed, as shown by the arrows A. The light source 104 can be a single light source or can comprise a plurality of lamps 114 positioned on at least two sides of a camera lens 116 of a respective video camera 102, as represented by one of the video cameras in FIG. 1. A power source 106 is electrically coupled to the plurality of video cameras 102 and the light sources 104. A controller 108 is configured to receive video signals from each of the plurality of video cameras 102 and control a display 110 to simultaneously display each of the video signals. The controller 108 can capture the video signals and display the video signals remotely or save the video signals for viewing at a later time.

Each of the plurality of video cameras 102 is connected to the power source 106 by a respective electrical conduit 112 of a length to allow for individual placement of each of the plurality of video cameras 102. The video cameras 102 can be connected to the power source 106 through the controller 108, or can be directly connected to both the power source 106 and the controller 108. A computer can function as both the power source 106 and the display 110, and can also function as the controller 108. The power source 105 can be an independent power source, such as a 5V source, a laptop through a USB port, or the vehicle itself. Each of the respective electrical conduits 112 can integrally include wiring for one of the video cameras 102 and its respective light source 104.

Some of the video cameras 102 are configured to video a first component 52 and other of the video cameras 102 are configured to video a second component 54, with all of the video cameras providing video signals to the controller 108 simultaneously. As illustrated in the figures, the video cameras 102 are positioned directly across the first or second component 52, 54 from each other. However, this positioning is provided as a non-limiting example. A video camera 102 can be positioned at any position with respect to other video cameras 102. The video cameras 102 and each respective light source 104 are sized for placement in a cavity within a vehicle defined by at least one body panel 56 of the vehicle.

Figure 2:
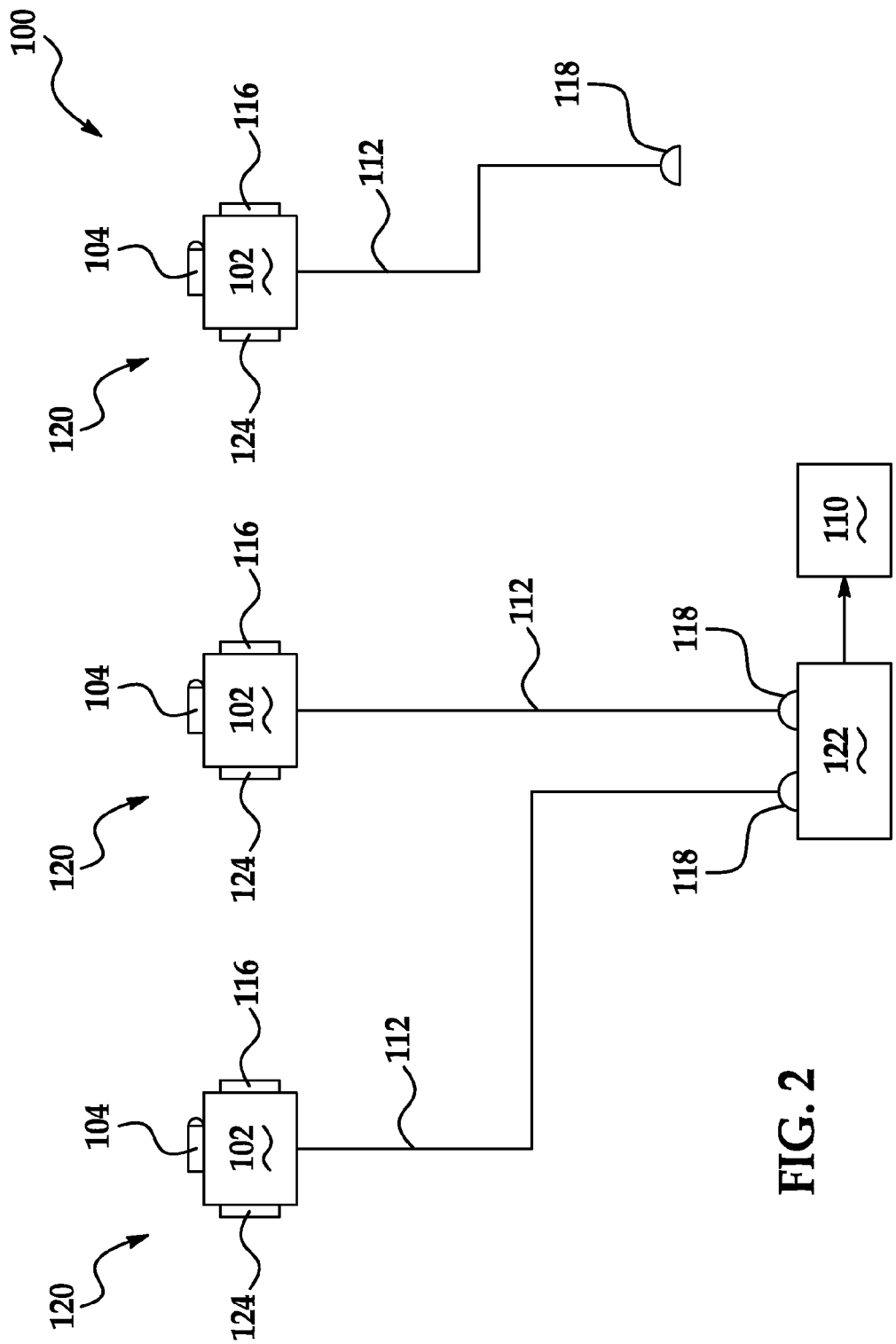
FIG. 2 is a schematic of an aspect of the video apparatus for monitoring a vehicle component undergoing testing as disclosed herein.

As illustrated in FIG. 2, the video apparatus 100 can have a plurality of modules 120. Each module comprises a video camera 102, a light source 104, electrical conduit 112, and a plug 118 configured for connection to the power source. As shown in FIG. 2, the computer 122 functions as the power source 106 and the controller 108. The modules 120 can be connected to the computer 122 or disconnected as desired or required. For example, a test may only require two of the plurality of video cameras 102, so only two modules 120 are required.

Each of the video cameras 102 can have a magnetic attachment structure 124 configured to removably mount the video camera 102 to a support such as the vehicle component 50 or body panel 56. The video apparatus 100 can also comprise a water presence detector configured to be positioned on the vehicle component 50. The water presence detector can be a powder that is dusted on the vehicle component 50 as a non-limiting example.

The video apparatus 100 is sized and configured to be portable so that it can be easily moved from component to component or from vehicle to vehicle in a testing facility, or used remotely in a road test, for example.

As noted, the controller 108 can capture the video signals and display the video signals remotely or save the video signals for viewing at a later time. The video apparatus 100 can incorporate motion activation to trigger recording when the video signals are not being concurrently monitored. The activated video can be stamped with the date and time for subsequent review. Motion activation can also prevent the use of excessive amounts of video for testing over an extended period of time.

The captured video signals can be correlated to other measurements or inspections to improve accuracy of testing and detection. The video signals can also be used to measure testing results directly from the display. For example, if a fracture is a result of testing, the size and extent of the fracture can be measured directly on the display.

Figure 3:
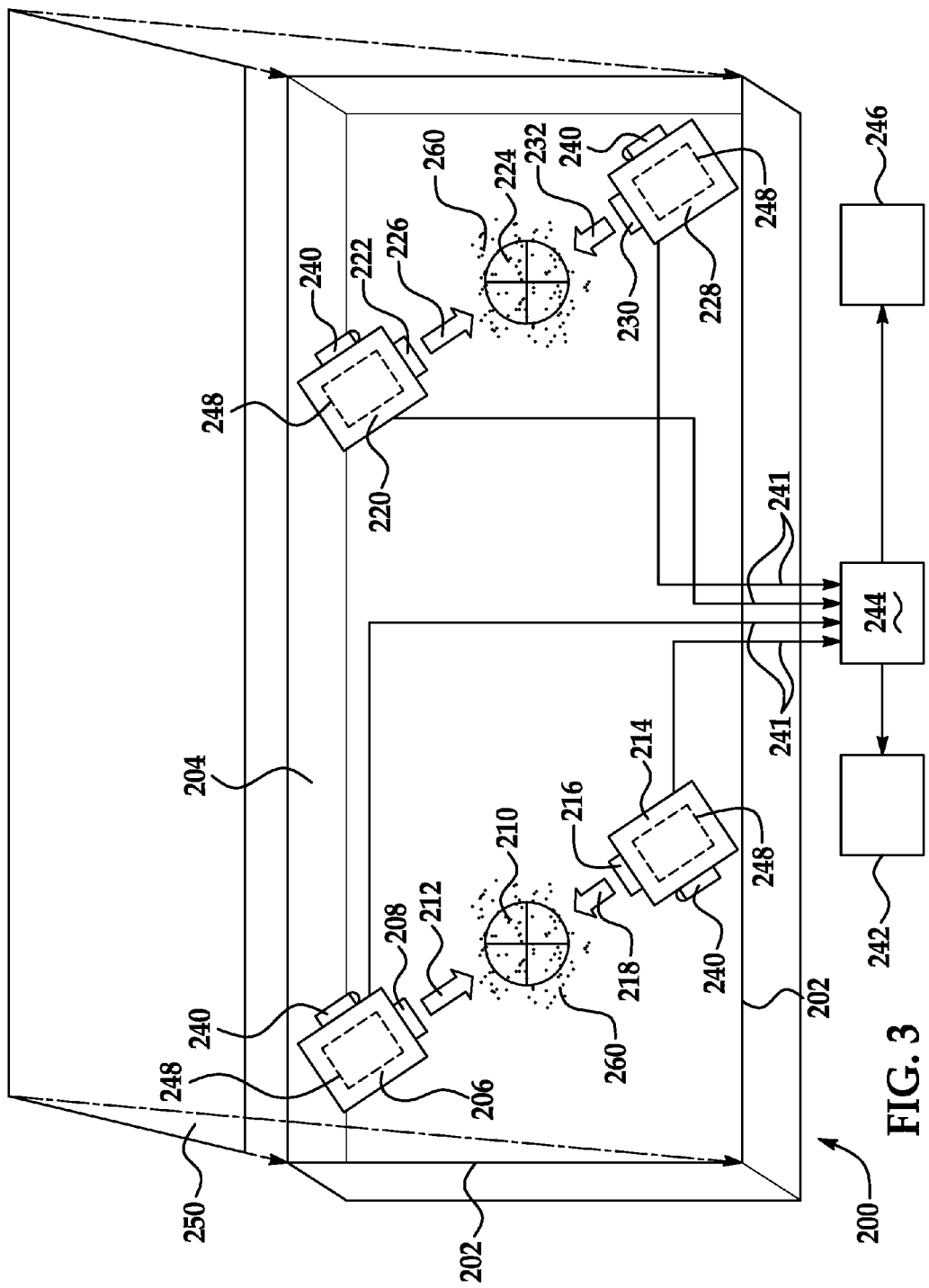
FIG. 3 is a schematic of a cowl water intrusion test monitoring apparatus as disclosed herein.

The video apparatus 100 can be used as a cowl water intrusion test monitoring apparatus 200, as illustrated in FIG. 3. Under cowl/wiper module water leak testing is conventionally performed using dust, which is "dusted" onto the wiper module prior to assembling the wiper module. However, any wet conditions indicated by the dust only indicate that the system is getting wet. The testing does not provide from where the water is actually coming from. To determine where in the water is gaining access, the cowl and wiper components must be removed multiple times to inspect, photograph, and dry the system components and re-test.

The cowl water intrusion test monitoring apparatus 200 addresses these drawbacks. The apparatus 200 comprises a mounting surface comprising a body panel 202 of a vehicle, the body panel partially defining a cavity 204. A first video camera 206 is removably mounted to the body panel 202 within the cavity 204 and oriented such that a lens 208 of the first camera 206 is pointed toward a first component 210 in a first direction 212. A second video camera 214 is removably mounted to the body panel 202 within the cavity 204 and oriented such that a lens 216 of the second camera 214 is pointed toward the first component 210 in a second direction 218 that is different than the first direction 212. A third video camera 220 is removably mounted to the body panel 202 within the cavity 204 and oriented such that a lens 222 of the third camera 220 is pointed toward a second component 224 in a third direction 226. A fourth video camera 228 is removably mounted to the body panel 202 within the cavity 204 and oriented such that a lens 230 of the fourth camera 228 is pointed toward the second component 224 in a fourth direction 232 that is different than the third direction 226.

A light source 240 is coupled to a respective video camera 206, 214, 220, 228 and oriented in a same direction as the lens 208, 216, 222, 230 of the respective video camera 206, 214, 220, 228. A power source 242 is electrically coupled to each of the video cameras 206, 214, 220, 228 and light sources 240 by a respective electrical conduit 241 of a length to allow for individual placement of each of the plurality of video cameras 206, 214, 220, 228. A controller 244 is configured to receive video signals from the first, second, third and fourth video cameras 206, 214, 220, 228 and simultaneously display each of the video signals on display 246. The video cameras 206, 214, 220, 228 can be connected to the power source 242 through the controller 244, or can be directly connected to both the power source 242 and the controller 244. A computer can function as both the power source 242 and the display 246, and can also function as the controller 244. Each of the respective electrical conduits 241 can integrally include wiring for one of the video cameras 206, 241, 220, 228 and their respective light source 240.

Each of the video cameras 206, 214, 220, 228 can have a magnetic attachment structure 248 configured to removably mount the video camera to the body panel 202. The apparatus 200 can also comprise a water presence detector 260 configured on each of the first component 210 and second component 224.

Figure 4:
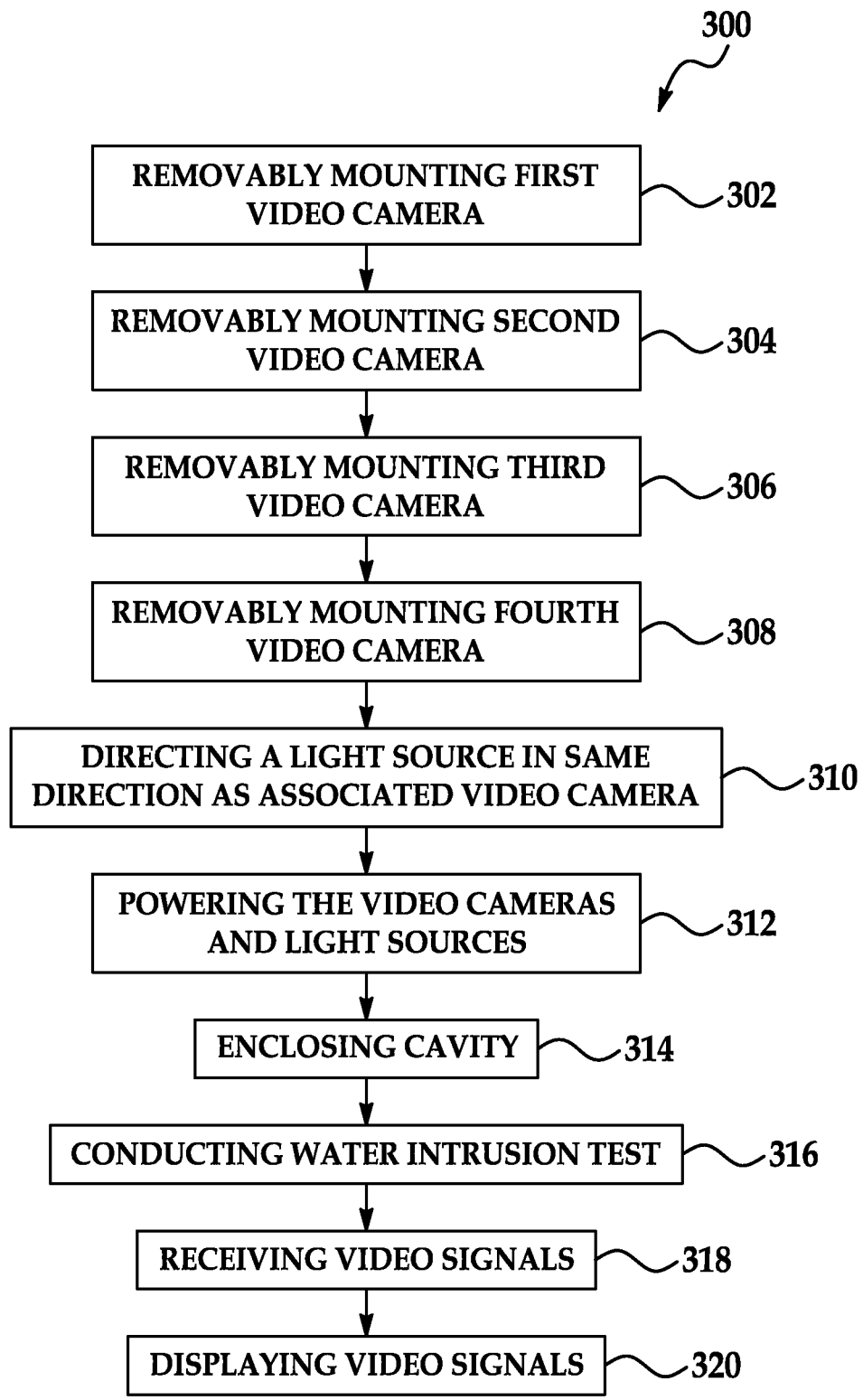
FIG. 4 is a flow diagram of a method of monitoring cowl water intrusion as disclosed herein.

A method 300 of monitoring cowl water intrusion using the apparatus 200 disclosed herein is shown in FIG. 4. The method 300 includes removably mounting the first video camera 206 to the body panel 202 within the cavity 204 in 302. The cavity 204 is defined by the body panel 202 and a cowl cover 250. The lens 208 of the first camera 206 is pointed toward the first wiper pivot 210 in the first direction 212. Next in the method, in 304, is removably mounting the second video camera 214 to the body panel 202 within the cavity 204 such that the lens 216 of the second camera 214 is pointed toward the first wiper pivot 210 in the second direction 218 that is different than the first direction 212. In 306, the third video camera 220 is removably mounted to the body panel 202 within the cavity 204 such that the lens 222 of the third camera 220 is pointed toward the second wiper pivot 224 in the third direction 226, and in step 308, the fourth video camera 228 is removably mounted to the body panel 202 within the cavity 204 such that the lens 230 of the fourth camera 228 is pointed toward the second wiper pivot 224 in the fourth direction 232 that is different than the third direction 226.

In 310, a light source 240 coupled to a respective video camera 206, 214, 220, 228 illuminates in the same direction that the lens 208, 216, 222, 230 of the respective video camera 206, 214, 220, 228 is directed. Power from a single power source 242 is electrically coupled to each of the video cameras 206, 214, 220, 228 and light sources 240 in 312. The cavity 204 is enclosed with the cowl cover 250 in 314. A cowl water intrusion test is conducted in 316. Video signals from the first, second, third and fourth video cameras 206, 214, 220, 228 are received during the cowl water intrusion test and simultaneously displayed on the display 246 in 318 and 320 respectively.

The light source 240 and the respective video camera 206, 214, 220, 228 can have an integral electrical conduit 241 and a plug (as shown in FIG. 2) configured to be connected and disconnected to the single power source 242. The light source 240 can comprise a plurality of lamps positioned on at least two sides of the respective camera lens 208, 216, 222, 230 of the video camera 206, 214, 220, 228. Each of the respective video cameras 206, 214, 220, 228 can have an associated magnetic attachment structure 248 for removably mounting the respective video camera 206, 214, 220, 228.

A water presence detector 260 can be placed on and around the first wiper pivot 210 and the second wiper pivot 224 as shown in FIG. 3, prior to enclosing the cavity 204 such that the respective video camera 206, 214, 220, 228 videos the water presence detector 260.

Use of the video apparatus 100 is described above specifically in relation to monitoring a cowl area for water intrusion during a cowl water intrusion test. However, the video apparatus 100 may be used to monitor multiple angles of generally any vehicle component that is obstructed from view during a corresponding test procedure. As non-limiting examples, the video apparatus 100 can be used in HVAC applications to monitor water leakage into cabin airflow system and how the water is entering (e.g. spray, splash, bounce, overflow), in suspension durability testing, including monitoring suspension systems (e.g. shocks, brakes) during actual driving conditions, in simulated driving conditions (e.g. 4-Post testing) or shipping, in water intrusion testing of body or door panels (e.g. fender panel, between inner and outer door panels, fuel door, etc.), and in water intrusion testing between lamp assemblies and body panels.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A video apparatus for monitoring a vehicle component undergoing testing comprising:
  a plurality of video cameras, each video camera including a lens and a coupled light source, the light source configured to direct light in a direction that the lens of the video camera is directed;
  a power source electrically coupled to the plurality of video cameras; and
  a controller configured to:
  receive video signals from each of the plurality of video cameras; and
  control a display to simultaneously display each of the video signals.

2. The video apparatus of claim 1, wherein each of the plurality of video cameras is connected to the power source by a respective electrical conduit of a length to allow for individual placement of each of the plurality of video cameras.

3. The video apparatus of claim 1, wherein a first portion of the plurality of video cameras is configured to video a first component and a second portion of the plurality of video cameras is configured to video a second component, the first portion and second portion providing video signals simultaneously.

4. The video apparatus of claim 3, wherein both the first portion and the second portion of the plurality of video cameras and respective light sources are configured to be positioned in a cavity between a vehicle body panel and a cowl cover.

5. The video apparatus of claim 1, wherein the plurality of video cameras and respective light sources are sized for placement in a cavity within a vehicle defined by at least one body panel of the vehicle.

6. The video apparatus of claim 1, wherein the display and power source are a computer.

7. The video apparatus of claim 2, wherein each of the respective electrical conduits integrally includes wiring for one of the plurality of video cameras and a respective light source.

8. The video apparatus of claim 1 comprising a plurality of modules, each module comprising one of the plurality of video cameras, its respective light source, electrical conduit, and a plug configured for connection to the power source.

9. The video apparatus of claim 1, wherein each of the plurality of video cameras comprises a magnetic attachment structure configured to removably mount the video camera to a support.

10. The video apparatus of claim 1, wherein each light source comprises a plurality of lamps positioned on at least two sides of the camera lens of the respective video camera.

11. The video apparatus of claim 1 further comprising:
  a water presence detector configured to be positioned on the vehicle component and videoed by at least one of the plurality of video cameras.

12. The video apparatus of claim 11, wherein the water presence detector is a powder.

13. A cowl water intrusion test monitoring apparatus comprising:
  a first video camera removably mounted to a body panel defining a vehicle cavity and oriented such that a lens of the first video camera is pointed toward a first component in a first direction;
  a second video camera removably mounted to the body panel within the vehicle cavity and oriented such that a lens of the second video camera is pointed toward the first component in a second direction that is different than the first direction;
  a third video camera removably mounted to the body panel within the cavity and oriented such that a lens of the third camera is pointed toward a second component in a third direction;
  a fourth video camera removably mounted to the body panel within the vehicle cavity and oriented such that a lens of the fourth camera is pointed toward the second component in a fourth direction that is different than the third direction;

wherein each of the video cameras include a light source coupled to the respective video camera and oriented in a same direction as the lens of the respective video camera;
a power source electrically coupled to each of the video cameras and light sources; and
a controller configured to:
receive video signals from the first, second, third and fourth video cameras; and
simultaneously display each of the video signals.

14. A method of monitoring cowl water intrusion comprising:
removably mounting a first video camera to a body panel within a cavity defined by the body panel and a cowl cover such that a lens of the first camera is pointed toward a first wiper pivot in a first direction;
removably mounting a second video camera to the body panel within the cavity such that a lens of the second camera is pointed toward the first wiper pivot in a second direction that is different than the first direction;
removably mounting a third video camera to the body panel within the cavity such that a lens of the third camera is pointed toward a second wiper pivot in a third direction;
removably mounting a fourth video camera to the body panel within the cavity such that a lens of the fourth camera is pointed toward the second wiper pivot in a fourth direction that is different than the third direction;
orienting a plurality of light sources, each light source coupled to a respective video camera, in a same direction as the lens of the respective video camera is directed;
providing power from a single power source electrically coupled to each of the video cameras and respective light sources;
enclosing the cavity with the cowl cover;
running a cowl water intrusion test;
receiving video signals from the first, second, third and fourth video cameras during the cowl water intrusion test; and
simultaneously displaying each of the video signals on a display.

15. The method of claim 14, wherein each of the plurality of video cameras and respective light sources have an integral electrical conduit and a plug configured to be connected and disconnected to the single power source.

16. The method of claim 14, wherein each of the plurality of video cameras has an associated magnetic attachment structure for removably mounting the respective video camera.

17. The method of claim 14, wherein each of the light sources comprise a plurality of lamps positioned on at least two sides of a camera lens of the respective video camera.

18. The method of claim 14 further comprising:
placing a water presence detector on and around the first wiper pivot and the second wiper pivot prior to enclosing the cavity such that the plurality of video cameras video the water presence detector.

19. The method of claim 18, wherein the water presence detector is a powder.

* * * * *